(12) United States Patent
Sakoh et al.

(10) Patent No.: US 9,228,052 B2
(45) Date of Patent: Jan. 5, 2016

(54) ALLYL GROUP-MODIFIED FLUOROOXYALKYLENE GROUP-CONTAINING POLYMER AND METHOD FOR PRODUCING THE SAME

(71) Applicant: SHIN-ETSU CHEMICAL CO., LTD., Tokyo (JP)

(72) Inventors: Ryusuke Sakoh, Annaka (JP); Takashi Matsuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/524,313

(22) Filed: Oct. 27, 2014

(65) Prior Publication Data

US 2015/0148509 A1    May 28, 2015

(30) Foreign Application Priority Data

Nov. 22, 2013   (JP) .................. 2013-242289

(51) Int. Cl.
    *C08C 1/14*    (2006.01)
    *C08G 65/00*   (2006.01)
    *C08G 65/337*  (2006.01)
    *C08G 79/00*   (2006.01)

(52) U.S. Cl.
    CPC ............ *C08G 65/002* (2013.01); *C08G 65/007* (2013.01); *C08G 65/337* (2013.01); *C08G 2650/48* (2013.01)

(58) Field of Classification Search
    CPC ..................................................... C08G 77/58
    USPC ................ 528/9, 486; 422/41, 42, 44, 182
    See application file for complete search history.

(56) References Cited

U.S. PATENT DOCUMENTS 5,274,179 A * 12/1993 Wu ............................... 560/184
2003/0139620 A1   7/2003 Yamaguchi et al.

2008/0107950 A1   5/2008 Fukushima et al.
2011/0098402 A1   4/2011 Yamane et al.
2014/0302332 A1  10/2014 Murotani et al.

FOREIGN PATENT DOCUMENTS

| EP | 1 693 398 A1 | 8/2006 |
| JP | A-2003-238577 | 8/2003 |
| JP | A-2011-116947 | 6/2011 |
| WO | 2013/121984 A1 | 8/2013 |

OTHER PUBLICATIONS

Apr. 16, 2015 Extended Search Report issued in European Patent Application No. 14003711.0.
Alvey et al., "Additions of $PH_3$ to Monosubstituted Alkenes of the Formula $H_2C=CH(CH_2)_x(CF_2)_yCF_3$: Convenient, Mulitgram Syntheses of a Family of Partially Fluorinated Trialkylphosphines with Modulated Electronic Properties and Fluorous Phase Affinities," *J. Org. Chem.*, 1998, vol. 63, No. 18, pp. 6302-6308.

\* cited by examiner

*Primary Examiner* — Terressa Boykin
(74) *Attorney, Agent, or Firm* — Oliff PLC

(57) ABSTRACT

Provided is an allyl group-modified fluorooxyalkylene group-containing polymer that is represented by the following general formula (1) and has a number average molecular weight of 1,000 to 50,000 in terms of polystyrene,

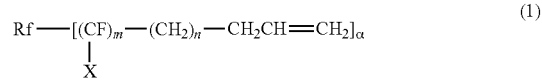

where Rf represents a monovalent or divalent fluorooxyalkylene group-containing polymer residue; "m" represents 1 or 2; X represents F or $CF_3$; "n" represents an integer of 0 to 10; and α represents 1 or 2. The fluorooxyalkylene group-containing polymer is excellent in terms of thermal stability and chemical stability, in addition to water- and oil-repellency, releasability, chemical resistance, lubricity, durability, antifouling property, and fingerprint-wiping property.

6 Claims, No Drawings

ALLYL GROUP-MODIFIED FLUOROOXYALKYLENE GROUP-CONTAINING POLYMER AND METHOD FOR PRODUCING THE SAME

BACKGROUND OF THE INVENTION

1. Field of the Invention

The present invention relates to a novel fluorooxyalkylene group-containing polymer and a method for producing the same.

2. Description of the Related Art

A fluoroalkylene group-containing polymer of which a terminal is modified with various reactive organic groups is used for a water-repellent oil-repellent antifouling agent for a paper and fibers, a lubricant for a magnetic recording medium, an oil proofing agent for a precision instrument, a mold release agent, a cosmetic material, a top coat, or the like.

In particular, when perfluoropolyether-modified silane in which a terminal of a fluoroalkylene group-containing polymer is modified through an ether bond (—C—O—C— bond) with a hydrolyzable silyl group is used as a top coat, or the like, a surface exhibiting water- and oil-repellency, releasability, chemical resistance, lubricity, durability, antifouling property, and fingerprint-wiping property can be provided (Patent Document 1). However, since the —C—O—C— bond in the perfluoropolyether-modified silane has an oxygen atom (heteroatom) between carbon atoms, thermal stability and chemical stability thereof are low. Therefore, the perfluoropolyether-modified silane is not suitable for application that demands these properties.

A method for bonding a fluoroalkylene group-containing polymer with a hydrolyzable silyl group through a siloxane bond (Patent Document 2) has been also proposed. In this method, a production process is made complex, and a larger amount of energy is required for a vapor deposition treatment as the molecular weight is larger. Therefore, this method is not always an industrially advantageous method.

On the other hand, as shown in the following reaction formula, an example of allylation of terminal iodide in a fluoroalkylene group-containing compound with a relatively low molecular weight is proposed (Non-Patent Document 1).

Allylation of Terminal Iodide of Fluoroalkylene

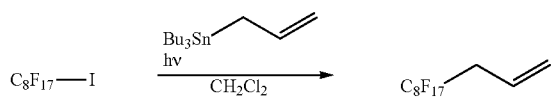

Allylation of Terminal Methylene Iodide of Fluoroalkylene

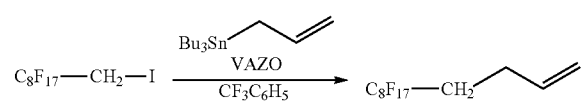

PRIOR ART DOCUMENTS

Patent Documents

Patent Document 1: Japanese Patent Laid-Open Publication No. 2003-238577

Patent Document 2: Japanese Patent Laid-Open Publication No. 2011-116947

NON-PATENT DOCUMENT

Non-Patent Document 1: J. Org. Chem. 1998, 63, 6302-6308

SUMMARY OF THE INVENTION

The present invention was made in view of the above situation, and has an object to provide a fluorooxyalkylene group-containing polymer that is excellent in thermal stability and chemical stability, in addition to water- and oil-repellency, releasability, chemical resistance, lubricity, durability, antifouling property, and fingerprint-wiping property.

In order to solve the problem as mentioned above, the present invention provides an allyl group-modified fluorooxyalkylene group-containing polymer that is represented by the following general formula (1) and has a number average molecular weight of 1,000 to 50,000 in terms of polystyrene,

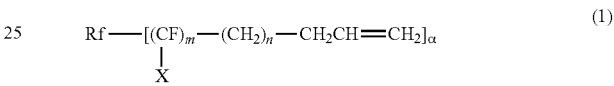

wherein, Rf represents a monovalent or divalent fluorooxyalkylene group-containing polymer residue; "m" represents 1 or 2; X represents F or $CF_3$; "n" represents an integer of 0 to 10; and α represents 1 or 2.

Since such an allyl group-modified fluorooxyalkylene group-containing polymer has no heteroatom and has a linkage of only a carbon-carbon (C—C) bond at the terminal, it can be excellent in thermal stability and chemical stability, in addition to water- and oil-repellency, releasability, chemical resistance, lubricity, durability, antifouling property, and fingerprint-wiping property.

In particular, it is preferable that α in the general formula (1) be 1 and the fluorooxyalkylene group-containing polymer residue be a monovalent residue represented by the following general formula (2),

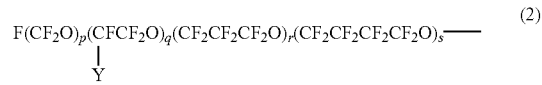

wherein, "p", "q", "r", and "s" each represent an integer of 0 to 200; p+q+r+s is 4 to 200; each repeating unit may be randomly bonded; and Y represents F or $CF_3$.

It is preferable that a in the general formula (1) be 2 and the fluorooxyalkylene group-containing polymer residue be a divalent residue represented by the following general formula (3),

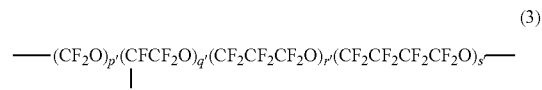

wherein, "p'", "q'", "r'", and "s'" each represent an integer of 0 to 200; p'+q'+r'+s' is 4 to 200; each repeating unit may be randomly bonded; and Y' represents F or $CF_3$.

Since the surface free energy of such fluorooxyalkylene group-containing polymers reduces due to the action of the fluorooxyalkylene group, they can have more excellent water- and oil-repellency, releasability, chemical resistance, lubricity, durability, antifouling property, and fingerprint-wiping property.

Further, the present invention provides a method for producing the allyl group-modified fluorooxyalkylene group-containing polymer including reacting a fluorooxyalkylene group-containing iodide-terminated polymer represented by the following general formula (4) with allyltrialkyltin in the presence of a radical initiator,

(4)

wherein, Rf represents a monovalent or divalent fluorooxyalkylene group-containing polymer residue; "m" represents 1 or 2; X represents F or $CF_3$; "n" represents an integer of 0 to 10; and α represents 1 or 2.

According to the method for producing the allyl group-modified fluorooxyalkylene group-containing polymer, a production process can be simplified, and the polymer can be produced industrially advantageously.

The surface free energy of the allyl group-modified fluorooxyalkylene group-containing polymer of the present invention reduces due to the action of the fluorooxyalkylene group. Therefore, the polymer can have more excellent water- and oil-repellency, releasability, chemical resistance, lubricity, durability, antifouling property, and fingerprint-wiping property. Further, since the polymer has no heteroatom and has a linkage of only a carbon-carbon (C—C) bond at the terminal, the polymer can be excellent in thermal stability and chemical stability, in addition to the above-described properties. According to the method for producing an allyl group-modified fluorooxyalkylene group-containing polymer of the present invention, the polymer can be produced simply and industrially advantageously without a complex production process.

DETAILED DESCRIPTION OF THE PREFERRED EMBODIMENTS

Since an existing fluoroalkylene group-containing polymer having an allyl group at the terminal has a heteroatom in the linkage to the allyl group, the thermal stability and the chemical stability thereof are low. The present inventors have found that by direct allylation of a fluorooxyalkylene group-containing polymer (perfluoropolyether), a fluorooxyalkylene group-containing polymer that has no heteroatom in the linkage and has an allyl group at the terminal, that is, in which a linkage group at the terminal of the polymer is only a carbon-carbon bond can be obtained, and the polymer has excellent thermal stability and chemical stability. Thus, the present invention has been completed.

Namely, the present invention is an allyl group-modified fluorooxyalkylene group-containing polymer that is represented by the following general formula (1) and has a number average molecular weight of 1,000 to 50,000 in terms of polystyrene,

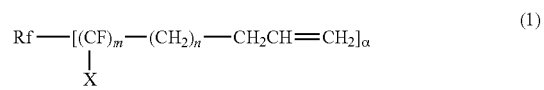
(1)

wherein, Rf represents a monovalent or divalent fluorooxyalkylene group-containing polymer residue; "m" represents 1 or 2; X represents F or $CF_3$; "n" represents an integer of 0 to 10, and preferably 0 or 1; and α represents 1 or 2.

When α in the general formula (1) is 1, it is preferable that a monovalent fluorooxyalkylene group-containing polymer residue represented by Rf be a monovalent fluorooxyalkylene group represented by the following general formula (2),

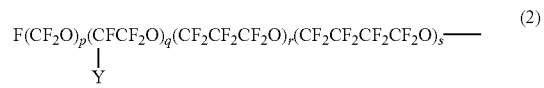
(2)

wherein, "p", "q", "r", and "s" each represent an integer of 0 to 200, and preferably 10 to 100; p+q+r+s is 4 to 200, and preferably 10 to 100; each repeating unit may be randomly bonded; and Y represents F or $CF_3$.

Such a monovalent fluorooxyalkylene group-containing polymer residue may be specifically exemplified by the following groups.

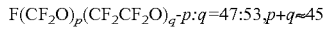

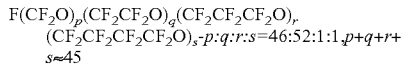

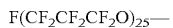

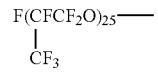

When α in the general formula (1) is 2, it is preferable that a divalent fluorooxyalkylene group-containing polymer residue represented by Rf be a divalent fluorooxyalkylene group represented by the following general formula (3),

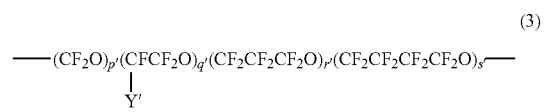
(3)

wherein, "p' r'", and "s'" each represent an integer of 0 to 200, and preferably 10 to 100; p'+q'+r'+s' is 4 to 200, and preferably 10 to 100; each repeating unit may be randomly bonded; and Y' represents F or $CF_3$.

Such a divalent fluorooxyalkylene group-containing polymer residue may be specifically exemplified by the following groups.

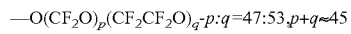
—O(CF$_2$O)$_p$(CF$_2$CF$_2$O)$_q$-$p$:$q$=47:53,$p$+$q$≈45

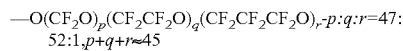
—O(CF$_2$O)$_p$(CF$_2$CF$_2$O)$_q$(CF$_2$CF$_2$CF$_2$O)$_r$-$p$:$q$:$r$=47:52:1,$p$+$q$+$r$≈45

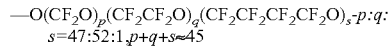
—O(CF$_2$O)$_p$(CF$_2$CF$_2$O)$_q$(CF$_2$CF$_2$CF$_2$CF$_2$O)$_s$-$p$:$q$:$s$=47:52:1,$p$+$q$+$s$≈45

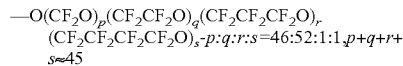
—O(CF$_2$O)$_p$(CF$_2$CF$_2$O)$_q$(CF$_2$CF$_2$CF$_2$O)$_r$(CF$_2$CF$_2$CF$_2$CF$_2$O)$_s$-$p$:$q$:$r$:$s$=46:52:1:1,$p$+$q$+$r$+$s$≈45

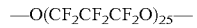
—O(CF$_2$CF$_2$CF$_2$O)$_{25}$—

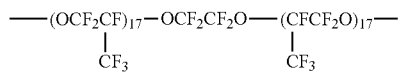
—(OCF$_2$CF)$_{17}$—OCF$_2$CF$_2$O—(CFCF$_2$O)$_{17}$—
         |                                |
        CF$_3$                           CF$_3$ The number average molecular weight of the allyl group-modified fluorooxyalkylene group-containing polymer represented by the general formula (1) falls within a range of 1,000 to 50,000, and preferably 1,500 to 10,000. When the number average molecular weight is less than 1,000, the water- and oil-repellency, antifouling property, and the like, that are properties of a perfluoroalkylene ether structure may not be sufficiently exerted. When it is more than 50,000, the concentration of a terminal functional group excessively decreases, and the reactivity with and the adhesion to a substrate may reduce. The number average molecular weight referred herein means a number average molecular weight measured under the following conditions by gel-permeation chromatography (GPC) using a polystyrene as a standard substance.

Measurement Conditions

Developing solvent: hydrochlorofluorocarbon (HCFC)-225

Flow rate: 1 mL/min

Detector: evaporative light scattering detector

Column: TSKgel Multipore HXL-M manufactured by TOSOH CORPORATION 7.8 mm φ×30 cm×2

Column temperature: 35° C.

Sample injection volume: 100 μL (HCFC-225 solution with a concentration of 0.3% by weight)

Since the surface free energy of such an allyl group-modified fluorooxyalkylene group-containing polymer reduces due to the action of the fluorooxyalkylene group, the polymer can have excellent water- and oil-repellency, releasability, chemical resistance, lubricity, durability, antifouling property, and fingerprint-wiping property. Further, since the polymer has no heteroatom and has a linkage of only a carbon-carbon (C—C) bond at the terminal, the polymer can be excellent in thermal stability and chemical stability, in addition to the above-described properties.

For a method for producing the allyl group-modified fluorooxyalkylene group-containing polymer represented by the general formula (1), a method for producing the allyl group-modified fluorooxyalkylene group-containing polymer including reacting a fluorooxyalkylene group-containing iodide-terminated polymer represented by the following general formula (4) with allyltrialkyltin in the presence of a radical initiator is preferred,

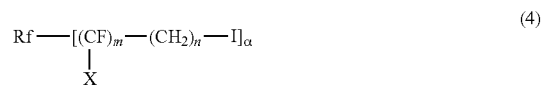

wherein, Rf represents a monovalent or divalent fluorooxyalkylene group-containing polymer residue; "m" represents 1 or 2; X represents F or CF$_3$; "n" represents an integer of 0 to 10; and α represents 1 or 2.

As allyltrialkyltin, the following compounds can be used.

Examples thereof may include allyltributyltin, allyltriphenyltin, allyltrimethyltin, allyltriethyltin, allyltripropyltin, and allyltribenzyltin.

As the radical initiator, the following compounds can be used.

Examples thereof may include azobisisobutyronitrile (AIBN), 1,1'-azobis(cyclohexanecarbonitrile) (ABCN, VAZO (registered trademark)), di-tert-butyl peroxide, tert-butyl hydroperoxide, benzoyl peroxide, and methyl ethyl ketone peroxide.

In the reaction, a solvent can be used. A solvent to be used in this reaction is not particularly limited, and a fluorine-containing solvent is preferably used since a reaction compound is a fluorine compound. Examples of the fluorine-containing solvent may include 1,3-bistrifluoromethylbenzene, trifluoromethylbenzene, a HFE-based solvent available from 3M (NOVEC7100: C$_4$F$_9$OCH$_3$, NOVEC7200: C$_4$F$_9$OC$_2$H$_5$, NOVEC7300: C$_2$F$_5$—CF(OCH$_3$)—CF(CF$_3$)$_2$, etc.), and a perfluoro-based solvent available from 3M (PF5080, PF5070, PF5060, etc.).

According to such a method for producing an allyl group-modified fluorooxyalkylene group-containing polymer, a fluorooxyalkylene group-containing polymer that is excellent in thermal stability and chemical stability, in addition to water- and oil-repellency, releasability, chemical resistance, lubricity, durability, antifouling property, and fingerprint-wiping property can be produced simply and industrially advantageously without a complex production process.

Since the allyl group-modified fluorooxyalkylene group-containing polymer of the present invention has excellent water- and oil-repellency, releasability, chemical resistance, lubricity, durability, antifouling property, and fingerprint-wiping property, the polymer can be suitably used for a water-repellent oil-repellent antifouling agent for a paper and fibers, a lubricant for a magnetic recording medium, an oil proofing agent for a precision instrument, a mold release agent, a cosmetic material, a top coat, or the like. Since the polymer has excellent thermal stability and chemical stability as compared with a conventional one, the polymer can be suitably used for a substance requiring the properties.

EXAMPLES

Hereinafter, the present invention will be specifically described by Examples, but the present invention is not restricted to the following Examples. In the following examples, the number average molecular weight is a value in terms of polystyrene determined by gel-permeation chromatography (GPC).

Example 1

20 g (3.0×10$^{-3}$ mol) of a compound represented by the following formula (4-a) (number average molecular weight: 3,750), 1.2 g (3.6×10$^{-3}$ mol) of allyltributyltin, and 20 g of hexafluoro-meta-xylene were mixed in a reactor, and nitrogen was passed through the mixture. Subsequently, 0.050 g (3.0×$10^{-4}$ mol) of AIBN was added and the mixture was stirred at 90° C. for 16 hours.

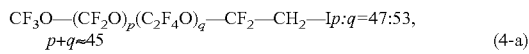
(4-a)

After that, the reaction product was cooled to room temperature, and a lower layer was isolated by separation operation. The obtained lower layer was washed with 20 g of hexane, and then with 20 g of acetone. The solvent was distilled off under reduced pressure, to obtain 17.5 g of allyl group-modified fluorooxyalkylene group-containing polymer (number average molecular weight: 3,650) that was represented by the following formula (1-a) and had an allyl group at one terminal. The structure of the resulting polymer was confirmed by $^1$H NMR. $^1$H NMR: δ5.65 (1H), δ4.92 (2H), δ2.19 (2H), δ2.01 (2H)

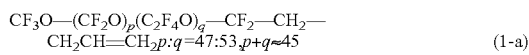
(1-a)

Example 2

20 g (1.0×$10^{-2}$ mol) of a compound represented by the following formula (4-b) (number average molecular weight: 3,850), 4.1 g (1.2×$10^{-2}$ mol) of allyltributyltin, and 20 g of hexafluoro-meta-xylene were mixed in a reactor, and nitrogen was passed through the mixture. Subsequently, 0.16 g (1.0×$10^{-3}$ mol) of AIBN was added and the mixture was stirred at 90° C. for 16 hours.

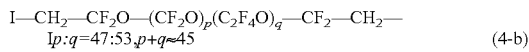
(4-b)

After that, the reaction product was cooled to room temperature, and a lower layer was isolated by separation operation. The obtained lower layer was washed with 20 g of hexane, and then with 20 g of acetone. The solvent was distilled off under reduced pressure, to obtain 18.4 g of allyl group-modified fluorooxyalkylene group-containing polymer (number average molecular weight: 3,650) that was represented by the following formula (1-b) and had an allyl group at both terminals. The structure of the resulting polymer was confirmed by $^1$H NMR. $^1$H NMR: δ5.65 (1H), δ4.92 (2H), δ2.19 (2H), δ2.01 (2H)

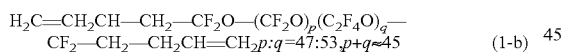
(1-b)

Example 3

20 g (2.5×$10^{-3}$ mol) of a compound represented by the following formula (4-c) (number average molecular weight: 4,300), 1.2 g (3.6×$10^{-3}$ mol) of allyltributyltin, and 20 g of hexafluoro-meta-xylene were mixed in a reactor, and nitrogen was passed through the mixture. Subsequently, 0.050 g (3.0×$10^{-4}$ mol) of AIBN was added and the mixture was stirred at 90° C. for 3 hours.

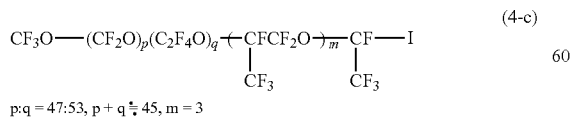
(4-c)

After that, the reaction product was cooled to room temperature, and a lower layer was isolated by separation operation. The obtained lower layer was washed with 20 g of hexane, and then with 20 g of acetone. The solvent was distilled off under reduced pressure, to obtain 17.0 g of allyl group-modified fluorooxyalkylene group-containing polymer (number average molecular weight: 4,200) that was represented by the following formula (1-c) and had an allyl group at one terminal. The structure of the resulting polymer was confirmed by $^1$H NMR. $^1$H NMR: δ5.64 (1H), δ5.13 (2H), δ2.80 (2H)

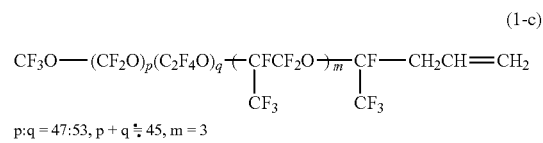
(1-c)

Therefore, it is clear that the allyl group-modified fluorooxyalkylene group-containing polymer of the present invention can be produced simply without a complex production process.

The present invention is not restricted to the embodiments shown above. The embodiments are merely examples, and any examples that have substantially the same configuration and demonstrate the same effects as the technical concept described in claims of the present invention are included in the technical scope of the present invention.

What is claimed is:

1. An allyl group-modified fluorooxyalkylene group-containing polymer that is represented by the following general formula (1) and has a number average molecular weight of 1,000 to 50,000 in terms of polystyrene,

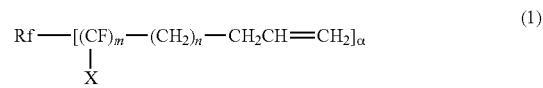
(1)

wherein, Rf represents a monovalent or divalent fluorooxyalkylene group-containing polymer residue; "m" represents 1 or 2; X represents F or $CF_3$; "n" represents an integer of 1 to 10; and α represents 1 or 2.

2. The allyl group-modified fluorooxyalkylene group-containing polymer according to claim 1, wherein α in the general formula (1) is 1, and the fluorooxyalkylene group-containing polymer residue is a monovalent residue represented by the following general formula (2),

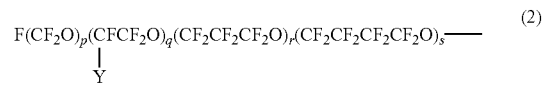
(2)

wherein, "p", "q", "r", and "s" each represent an integer of 0 to 200; p+q+r+s is 4 to 200; each repeating unit may be randomly bonded; and Y represents F or $CF_3$.

3. The allyl group-modified fluorooxyalkylene group-containing polymer according to claim 1, wherein α in the general formula (1) is 2, and the fluorooxyalkylene group-containing polymer residue is a divalent residue represented by the following general formula (3),

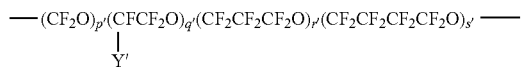 (3)

wherein, "p'", "q'", "r'", and "s'" each represent an integer of 0 to 200; p'+q'+r'+s' is 4 to 200; each repeating unit may be randomly bonded; and Y' represents F or $CF_3$.

4. A method for producing the allyl group-modified fluorooxyalkylene group-containing polymer according to claim 1, comprising reacting a fluorooxyalkylene group-containing iodide-terminated polymer represented by the following general formula (4) with allyltrialkyltin in the presence of a radical initiator,

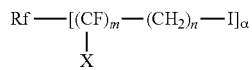 (4)

wherein, Rf represents a monovalent or divalent fluorooxyalkylene group-containing polymer residue; "m" represents 1 or 2; X represents F or $CF_3$; "n" represents an integer of 1 to 10; and α represents 1 or 2.

5. A method for producing the allyl group-modified fluorooxyalkylene group-containing polymer according to claim 2, comprising reacting a fluorooxyalkylene group-containing iodide-terminated polymer represented by the following general formula (4) with allyltrialkyltin in the presence of a radical initiator,

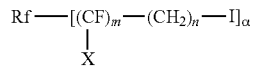 (4)

wherein, Rf represents a monovalent or divalent fluorooxyalkylene group-containing polymer residue; "m" represents 1 or 2; X represents F or $CF_3$; "n" represents an integer of 1 to 10; and α represents 1 or 2.

6. A method for producing the allyl group-modified fluorooxyalkylene group-containing polymer according to claim 3, comprising reacting a fluorooxyalkylene group-containing iodide-terminated polymer represented by the following general formula (4) with allyltrialkyltin in the presence of a radical initiator,

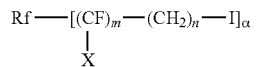 (4)

wherein, Rf represents a monovalent or divalent fluorooxyalkylene group-containing polymer residue; "m" represents 1 or 2; X represents F or $CF_3$; "n" represents an integer of 1 to 10; and α represents 1 or 2.

* * * * *